United States Patent [19]
Martin

[11] Patent Number: 5,757,490
[45] Date of Patent: May 26, 1998

[54] COMPACT THREE-AXIS RING LASER GYROSCOPE

[75] Inventor: Graham John Martin, Woodland Hills, Calif.

[73] Assignee: Litton Systems, Inc., Woodland Hills, Calif.

[21] Appl. No.: 690,482

[22] Filed: Jul. 31, 1996

[51] Int. Cl.$^6$ ................................. G01C 19/68
[52] U.S. Cl. ........................................ 356/350
[58] Field of Search ............................ 356/350

[56] References Cited

U.S. PATENT DOCUMENTS

| | | | |
|---|---|---|---|
| 3,741,657 | 6/1973 | Andringa | 356/350 |
| 4,246,549 | 1/1981 | Carter et al. | 356/350 X |
| 4,540,284 | 9/1985 | Gauert et al. | 356/350 |
| 4,795,258 | 1/1989 | Martin | 356/350 |
| 5,323,228 | 6/1994 | Moody | 356/350 |

Primary Examiner—Vincent P. McGraw
Attorney, Agent, or Firm—Elliott N. Kramsky

[57] ABSTRACT

Compact triaxial multioscillator configurations are based upon frames of rhombic dodecahedron and truncated octahedral shapes as taught by U.S. Pat. No. 4,795,258. Three non-planar cavities, each comprising four intersecting bores, intersect within the frames. External Faraday rotator assemblies comprising reverse mirrors and associated permanent magnets in differing configurations eliminate the need for intracavity elements to obtain nonreciprocal splitting. In the rhombic dodecahedron-shaped frame, external Faraday rotator assemblies are fixed to three planar faces at each of which pairs of segments of each of the internal nonplanar cavities converge. In the truncated tetrahedral frame, a single external Faraday rotator assembly is fixed to the single planar face at which pairs of segments of the three nonplanar cavities converge in a pattern forming the apexes of a centered equilateral triangle. A cavity length control mirror is fixed to each of the other three block surfaces upon which pairs of segments of the three non-planar cavities converge.

5 Claims, 4 Drawing Sheets

COMPACT THREE-AXIS RING LASER GYROSCOPE

BACKGROUND

1. Field of the Invention

The present invention relates to intertial sensors. More particularly, this invention pertains to the compact design for a triaxial ring laser gyroscope of the multioscillator type.

2. Description of the Prior Art

The multioscillator has been proposed as a means for overcoming the "lock-in" problem in ring laser gyroscopes. As is well known, lock-in refers to the tendency of counterpropagating beams to lase at a single frequency, or lock point, at low input rotation rates. As such, ring laser gyroscopes are essentially insensitive to rotation rates below known characteristic thresholds. The range of input rates over which the gyro gives no output is known as the "dead band". One common means of overcoming this insensitivity is known as mechanical dither and involves the application of a bounded oscillatory motion to the gyro frame. In this way, the gyro is continually swept through the deadband and the effects of lock-in are greatly reduced. The shortcomings of the mechanically dithered gyroscope are well recognized in the art.

In contrast, a multioscillator operates as a pair of two-mode ring laser gyroscopes sharing a single cavity. The multioscillator light cavity sustains a substantially left circularly polarized (LCP) beam pair, comprising one beam circulating in the clockwise direction and the other in the counterclockwise direction, as well as a substantially right circularly polarized (RCP) counterpropagating beam pair. Ideally, each beam pair acts independently as a two-mode ring laser gyroscope and senses body rotation by means of the Sagnac effect.

In order to achieve independent operation of the two gyroscopes within the same cavity, the LCP beam pair must be separated in frequency from the RCP beam pair. This separation, known as "reciprocal splitting" is typically on the order of a few hundred MHz. By employing a non-planar light path that produces different round-trip phase shifts for LCP and RCP light and, thus, different lasing frequencies, the required reciprocal splitting may be accomplished without the use of lossy active intracavity elements.

Each of the LCP and RCP gyros, while operating independently of one another, is, however, still subject to the lock-in phenomenon. A second bias, known as "nonreciprocal splitting" is imposed for overcoming the lock-in effect. Nonreciprocal splitting is commonly accomplished by introducing a Faraday rotation into the cavity. When circularly polarized light passes through a Faraday rotator, it experiences a phase shift that depends upon the direction of propagation through the rotator. As such, the clockwise and counterclockwise beams of the LCP and RCP gyros experience different phase shifts and thus lase at different frequencies. Typical values of nonreciprocal splitting in a multioscillator are much smaller (about 1 MHz) than reciprocal splitting values. Nonreciprocal splitting may be achieved by means of an intracavity element of suitable glass mounted within an axial magnetic field as taught by the United States patent of Andringa, U.S. Pat. No. 3,741,657 entitled "Differential Laser Gyro System". Another approach involves surrounding the gaseous gain medium of the cavity with an axial magnetic field as described in U.S. Pat. No. 4,229,106 of Dorschner et al. for "Electromagnetic Ring Resonator".

When nonreciprocal splitting is applied to the multioscillator in the prescribed manner, the resulting bias shift in the left circularly polarized gyro is equal but opposite in sign to the bias shift in the right circularly polarized gyro. Thus, when the outputs of the two gyros are summed, the resultant signal is doubly sensitive to body rotation but independent of the magnitude of the applied bias. In this way, the differential nature of the multioscillator makes it inherently insensitive to bias variations that can be caused, for example, by changes in the magnetic field, temperature or the like, which have proven to be major problems in single gyro, two-mode designs that utilize a d.c. bias.

Propagation systems must measure space-dependent variables, such as rotation, with respect to (or about) a set of three orthogonal axes. The design of a three-axis multioscillator or, in fact, any ring laser, that is sufficiently compact and realizable in a manufacturing sense is beset by numerous difficulties. In the operation of a ring laser, the chosen fill gas(es) necessarily interact with electrical fields to produce the desired lasing action. Thus, the design of any ring laser gyroscope must provide for the positioning of anodes and cathodes in addition to locating mirror faces and internal bores.

U.S. Pat. No. 4,795,258 of Martin entitled "Nonplanar Three-Axis Ring Laser Gyro With Shared Mirror Faces" teaches triaxial multioscillator designs that feature glass block gyro frames bounded by a plurality of planar surfaces which enclose three intersecting nonplanar cavities. Each cavity consists of four equal segments or bores for measuring rotation about three orthogonal axes. The patent discloses two configurations, one based upon a regular octahedron that is truncated to form a fourteen-sided frame and the other being a rhombic dodecahedron comprising twelve planar surfaces. Each of the designs taught by that patent improves upon prior triaxial multioscillators by offering a substantial reduction in the required number of electrodes. By minimizing the number of electrodes, the devices achieve advantages over, for example, the United States patent of Styles et al. (U.S. Pat. No. 4,477,188) that requires six anodes and two cathodes and that of Simms (U.S. Pat. No. 4,407,583) that requires six anodes and a single cathode. This leads to gyros of smaller cavity lengths as smaller frames are possible when one reduces the possibility of undesired interactions between surface-mounted electrodes.

While the device disclosed in the Martin patent represents an improvement, each of the embodiments taught by it is limited in terms of possible size reduction or miniaturization by the presence of intracavity Faraday rotators. Such a rotator typically comprises an exterior "doughnut" of magnetic material that is filled with glass. The disk-like rotator is mounted within each of the three non-planar cavities. The segment of a cavity into which the rotator is fixed includes a discontinuity in diameter that forms an annular shoulder. The gyro is assembled by pushing the rotator through the enlarged diameter portion of the appropriate cavity segment until it abuts the annular shoulder. The periphery of the rotator is then bonded to the annular shoulder by means of an appropriate agent such as indium.

Both of the multioscillator configurations of the Martin patent are suitable for gyro cavity lengths of about fifteen centimeters or more. While providing a model that is theoretically capable of functioning at even smaller cavity lengths, both of the configurations encounter manufacturing difficulties when one attempts to realize designs of lesser cavity length. This is quite unfortunate as many applications place a premium upon compactness. For example, military applications involving pointing, tracking and target discrimination accomplished by unmanned aerial vehicles, seeker missiles, small satellites, platforms for laser communications and synthetic aperture radar place a premium upon compactness.

Manufacturing-related problems encountered when one attempts to shrink a gyro frame of the above-described type to accommodate cavities in the range of ten centimeters are closely related to the use of intracavity rotators. For example, the amount of material removed when creating an enlarged-diameter cavity segment portion becomes proportionately greater as the overall size of the glass frame shrinks. As such, the structural integrity of the glass frame is weakened to a greater extent by the required overboring than would occur in a larger frame. Also, by shrinking the lengths of the cavity segments, the effects of stray magnetic fields on the plasma increase, introducing bias and the magnetic fields from the Faraday rotators for each axis overlap, created unwanted transverse fields and complications in magnet design. The process of inserting the rotator into the cavity of a miniaturized gyro while maintaining a clean environment is much more tedious in a small frame than in a larger device, significantly reducing yield. In addition to the problems associated with an intracavity Faraday rotator, miniaturization of the gyro frame forces corresponding shrinkage of the web that supports the gyro's pzt mirror. This can produce undesirable web stiffness resulting from limitations upon the ability to maintain the aspect ratio of a very small web while providing structural integrity.

The problems associated with the need for overbored sections of cavity segments described above become particularly acute in the case of a fourteen-sided frame. The cavities of such frame intersect at much more acute angles than do those of the rhombic dodecahedron. As the intersecting segments become more nearly parallel, the areas of intersection between cavities become relatively greater. This relative increase is magnified in a miniaturized frame, raising the possibility of the encroachment of plasma from one cavity into another. This effectively limits the possibility of reducing the fourteen-sided frame to gyros having cavity lengths of between fifteen and twenty centimeters.

SUMMARY OF THE INVENTION

The present invention addresses the foregoing problems of the prior art by providing a ring laser gyroscope for measuring rotation about three orthogonal axes. The gyroscope includes a three-dimensional frame. The exterior of the frame comprises a plurality of planar surfaces. Three intersection closed non-planar cavities are located within the frame.

Each of the cavities comprises four segments of equal lengths that converge at planar surfaces of the frame. Straight segments of at least two cavities converge at least one planar surface of the frame. Means is provided for creating nonreciprocal splitting of modes within at least one of the cavities. Such means is fixed to at least one predetermined planar surface of the frame.

The preceding and other features and advantages of the present invention will become further apparent from the detailed description that follows. Such detailed description is accompanied by a set of drawing figures. Numerals of the drawing figures, corresponding to those of the written description, point to the various features of the invention. Like numerals refer to like features throughout both the written description and the drawing figures.

DETAILED DESCRIPTION OF THE PREFERRED EMBODIMENT

Figure 1:
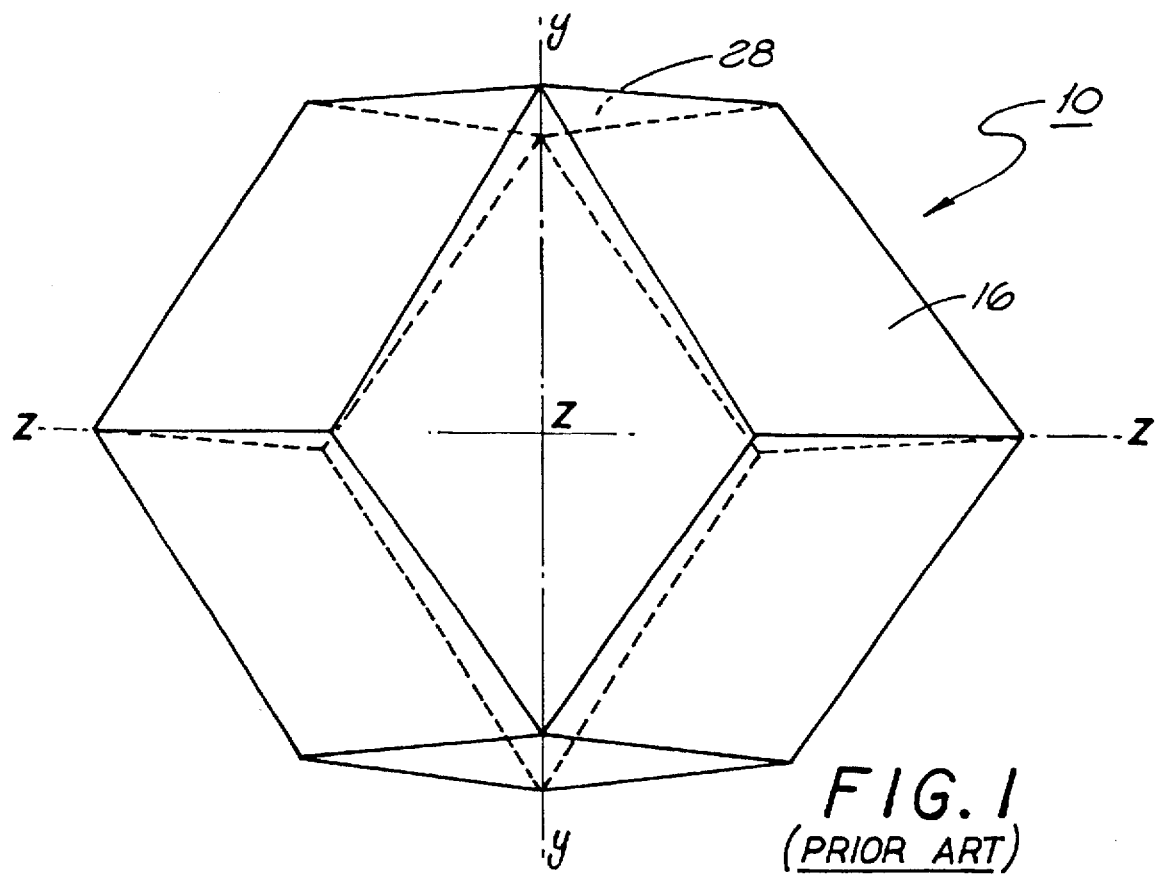
FIG. 1 is a perspective view of the frame of the rhombic dodecahedron type for accommodating a multioscillator in accordance with U.S. Pat. No. 4,795,258.

FIG. 1 is a perspective view of a frame 10 of the rhombic dodecahedron type for accommodating a multioscillator in accordance with the teachings of U.S. Pat. No. 4,795,258, described above. The frame 10 of the multioscillator comprises a block of suitably low efficient of thermal expansion material such as the glass ceramic marketed under the trademark ZERODUR.

The frame 10 is bounded by twelve planar surfaces as shown. An internal network of bores forming three continuous and mutually intersecting cavities, each cavity comprising four equal segments joined at their extremities to form a nonplanar configuration, is provided for sensing rotations about the orthogonal axes "x", "y" and "z". Light contact points are defined at selected planar surfaces of the frame 10 where pairs of segments of a cavity intersect.

The above-described arrangement of internal cavities is not illustrated for purposes of clarity and reference is made to the description and illustration of such internal cavities in U.S. Pat. No. 4,795,258. Such materials and descriptions with regard to frames of both the rhombic dodecahedron and regular octahedron type (discussed below) are hereby incorporated by reference into this application.

I. External Faraday Rotator

As mentioned earlier, the ability to reduce the size of a multioscillator generally in accordance with the teachings of the above-referenced United States patent is greatly hindered by the presence of intracavity Faraday rotators. This difficulty is overcome, and much smaller multioscillator designs are thereby made feasible, by the use of externally mounted devices for affecting nonreciprocal mode splitting within the RCP and LCP gyros that counterpropagate within each of the three multioscillator cavities. In the invention, nonreciprocal splitting is provided by the use of externally-mounted Faraday rotator assemblies. Such assemblies employ so-called reverse mirrors (i.e., mirrors whose reflective surfaces are separated from the gyro frame 10 by a glass substrate). A permanent magnet is associated with each reverse mirror. The external Faraday rotator assemblies are mounted with respect to areas of convergence of pairs of segments of internal nonplanar cavities at preselected planar surfaces of the frame 10.

Figure 2:
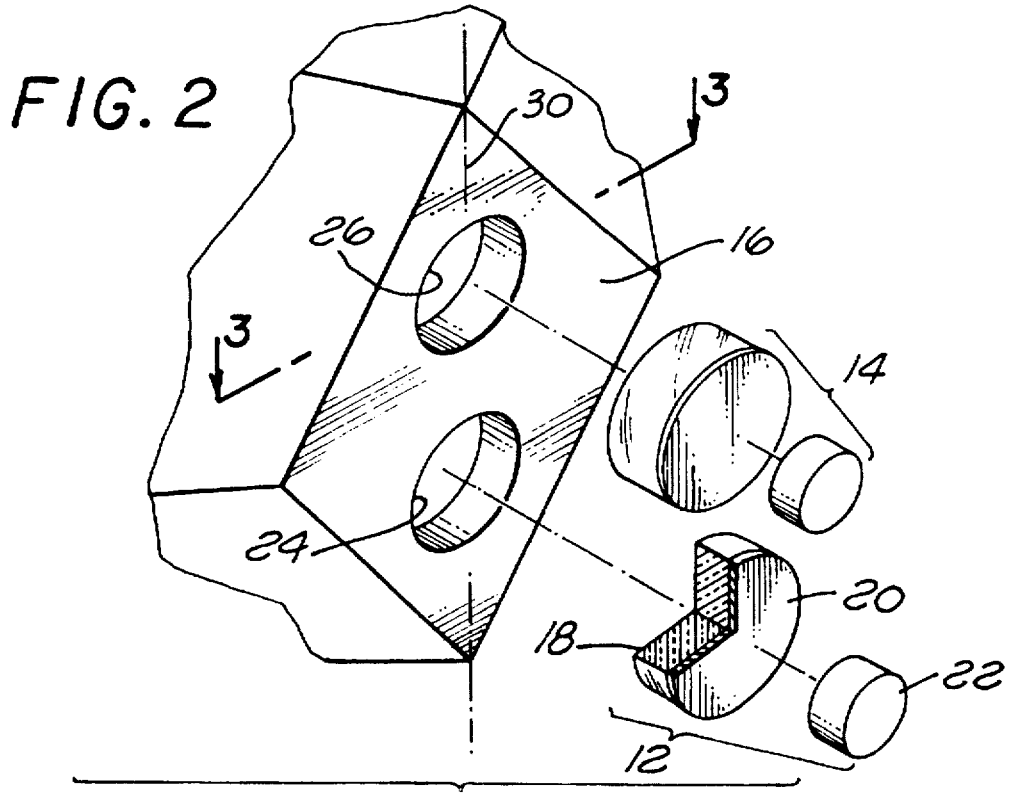
FIG. 2 is an exploded perspective view of external Faraday rotator assemblies for mounting to a predetermined planar face of the rhombic dodecahedron-shaped multioscillator frame of FIG. 1.

FIG. 2 is a exploded perspective view of a pair of external Faraday rotators 12 and 14 mounted to a predetermined planar face of the rhombic dodecahedron shaped multioscillator frame of FIG. 1. In particular, the Faraday assemblies 12 and 14 are fixed to the planar surface 16 of the frame 10. Referring to the representative assembly 12, components include a disk-shaped glass substrate 18, an overlying reflective coating 20 and a pill-shaped permanent magnet 22 arranged in a sandwich-like structure, shown below.

The external Faraday rotator assemblies 12 and 14 are affixed to the surface 16 atop mirror wells 24 and 26 that lie at the convergences of extrema of segments of internal nonplanar cavities. It will be discussed later that the surface 16 of the glass frame 10 is somewhat "shaved", reducing the depths of the mirror wells 24 and 26 prior to mounting the external Faraday rotators. As will be shown, such reduction is required to compensate for the thickness and index of the refraction of the glass substrate of the external Faraday rotators to assure that a single light contact point exists at the reflective surface of the reverse mirror.

A total of twelve light contact points occurs in a triaxial multioscillator, four associated with each of the three nonplanar cavities. In accordance with U.S. Pat. No. 4,795,258, two light contact points are provided at each of three planar surfaces and one at each of six others of the frame 10 of FIG. 1. The surface 16 is one of the two surfaces of the frame 10 to which external Faraday rotators are attached. A third external rotator assembly (not shown) is fixed to the surface 28. In this way, an assembly is associated with each of the nonplanar cavities housed within the frame 10. The geometry of the intersecting nonplanar cavities within the frame 10 assures that the mirror wells 24 and 26 are spaced equally (one third of the length) along a diagonal 30 of the surface 16.

Figure 3:
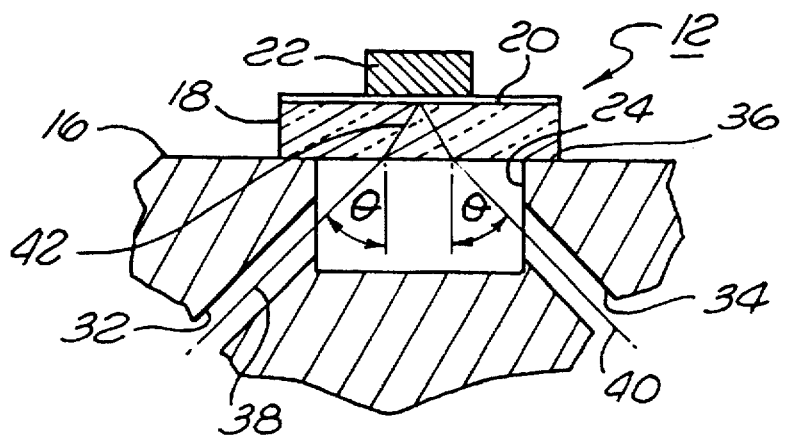
FIG. 3 is a cross-sectional view of an external Faraday rotator assembly mounted to a face of the rhombic dodecahedron-shaped multioscillator frame taken at line 3—3 of FIG. 2.

FIG. 3 is a cross-sectional view of the external Faraday rotator assembly as mounted to the face 16 taken generally at line 3—3 of FIG. 2. As can be seen, the external Faraday rotator assembly 12 is mounted to sit atop the mirror well 24 that is situated at the convergence of the segments 32 and 34 of one of the three nonplanar cavities internal to the frame 10. The mirror substrate 18 is highly polished so that it is fixed to the similarly highly polished face 16 of the frame 10 by atomic forces. The substrate 18 is preferably fabricated of quartz of high optical quality. The reflective coating 20 at the upper surface of the mirror substrate 18 may, for example, be formed of a quarter-wave stack comprising about thirty layers of silica-titania. A suitable anti-reflective coating 36 is formed at the bottom of the substrate 18.

The pill-shaped permanent magnet 22 is fixed to the upper surface of the substrate 18. The magnet 22 is preferably of low-thermal sensitivity material such as samarium/cobalt, an alloy-ceramic material having a thermal sensitivity of about 30 to 40 ppm/degrees Centigrade.

The material of the glass substrate 18 is selected and its thickness chosen so that counter-propagating light beams, successively reflected by the cavity mirrors along paths 38 and 40 to thereby travel through the straight bores or segments 32 and 34 respectively, are refracted within glass the substrate 18 to contact the mirrored surface 20 at a common light contact point 42. It is known that, for a rhombic dodecahedron, the angle of incidence Θ is:

$$\text{Arccos} \sqrt{2} / \sqrt{3}$$

This represents an angle of 35.2644 degrees. In order to obtain convergence at a single light contact point 42, with a 0.1 inch thick glass substrate 18 of silica (index of refraction 1.46), the height of the surface 16 relative to the segments 32, 34 (and the depth of the mirror well 24 with respect to the surface 16) is reduced, or "shaved", by about 0.061 inches from that of a frame 10 for use with intracavity Faraday rotators.

The substitution of external Faraday rotator assemblies for intracavity devices results in substantially the same or equivalent nonreciprocal splitting between the modes of the LCP and RCP gyros. In each case, the intracavity and the external arrangement provides the required glass element for the light to pass through in the presence of an axial magnetic field. While the light passes through the external Faraday rotator twice and only once through an intracavity device, no cancellation of the nonreciprocal mode splitting is encountered as mode helicity is reversed upon reflection.

Figure 4:
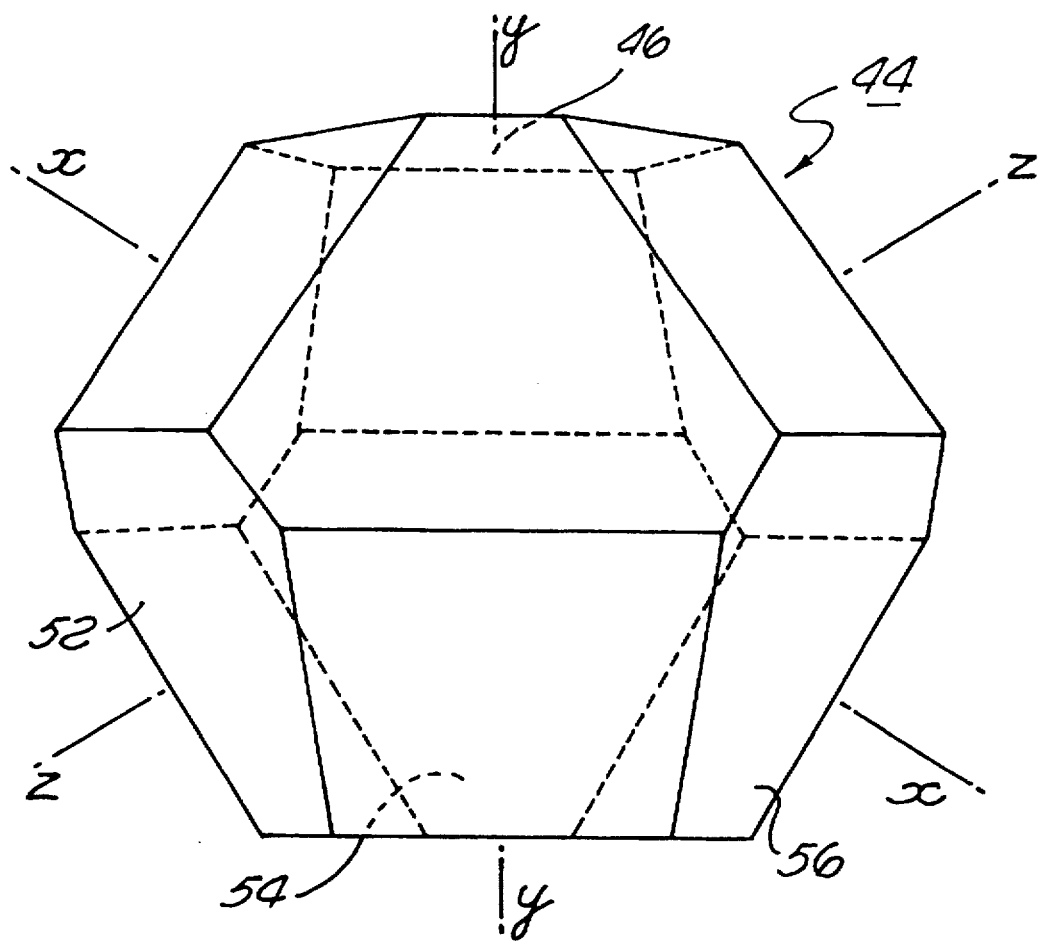
FIG. 4 is a perspective view of a frame of the regular octahedron type for accommodating a multioscillator in accordance with U.S. Pat. No. 4,795,258.

FIG. 4 is a perspective view of a frame 44 of the regular octahedron type for accommodating a multioscillator in accordance with U.S. Pat. No. 4,795,258. The mirror surfaces used to create the three nonplanar ring cavities with octagonal sensing axes actually lie on four of the eight surfaces of an octahedron and themselves form a tetrahedron. Thus, this geometry can also be referred to as a regular tetrahedron. The frame 44 is formed by selective truncation of a block of ZERODUR. Again, the internal bores or segments that define three intersecting nonplanar cavities are omitted for purposes of clarity. As in the case of the prior rhombic dodecahedron embodiment, each of the internal cavities comprises four straight segments of equal length that communicate at their extremities. The miniaturization of the multioscillator frame 44 employs the concept of an external Faraday rotator assembly as before. However, as will be seen below, unlike the assembly for a rhombic dodecahedron, only a single external assembly is required for nonreciprocal splitting in all three cavities. This reflects the fact that the geometry of the cavities internal to the regular octahedron, as taught by U.S. Pat. No. 4,795,258, which is incorporated by reference herein, is such that pairs of segments of all three nonplanar cavities converge at a single planar surface 46 of the frame 44. It will be seen below that pairs of segments of all three cavities additionally converge at three other faces of the frame 44. However, the relationship between the locations of the points of convergence at the surface 44 is unique and permits the use of a single external Faraday rotator of novel design.

Figure 5:
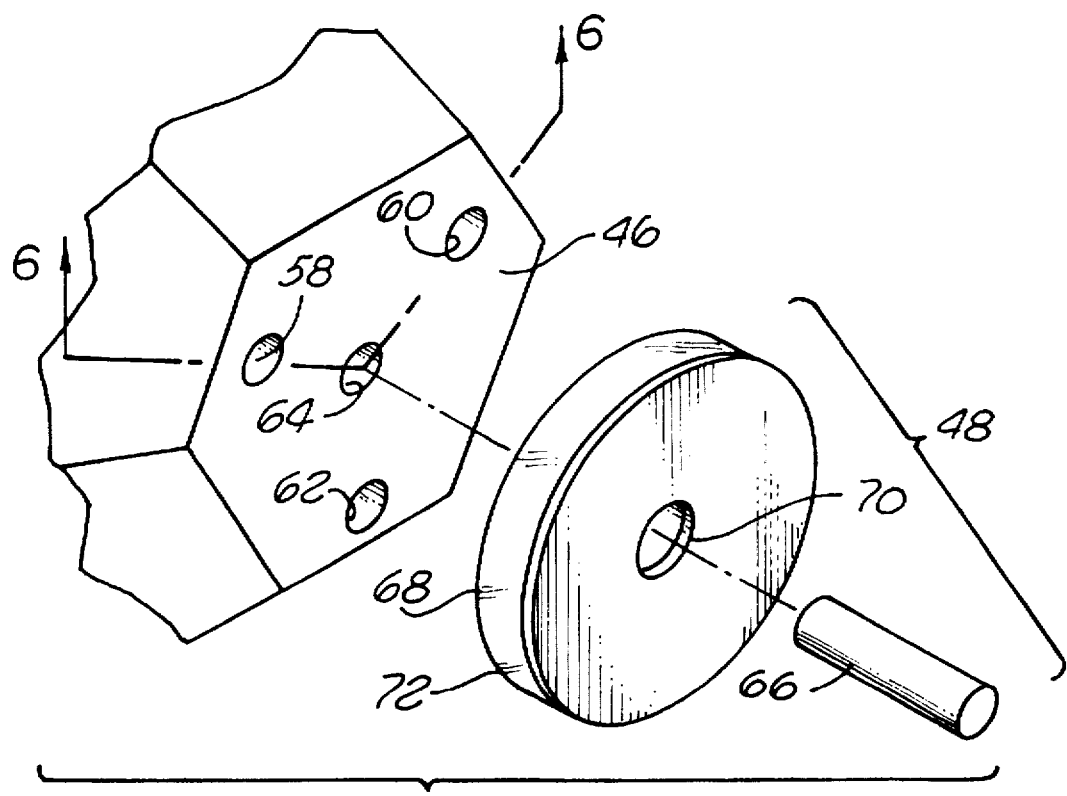
FIG. 5 is an exploded perspective view of an external Faraday rotator assembly for mounting to a predetermined planar face of the regular octahedron-shaped multioscillator frame of FIG. 4.

FIG. 5 is an exploded perspective view of the external Faraday rotator assembly 48 for mounting to the planar face 46 of the frame 44. The fourteen-sided frame 44 includes four surfaces 50, 52, 54 and 56 which lie on the sides of a tetrahedron (refer to FIG. 4), at which pairs of cavity segments for all three nonplanar cavities converge. In the invention, each of such surfaces is employed for mounting of an external element. While the surface 46, as mentioned earlier, is utilized for mounting an external Faraday rotator assembly, the remaining surfaces are employed for mounting cavity length mirrors, discussed below.

Returning the FIG. 5, mirror wells 58, 60 and 62 at which pairs of nonplanar cavities for measuring rotation about the three orthogonal axis terminate, are equally spaced about the periphery of the six-sided face 46. A bore 64 is formed at the center of the surface 46 for receiving an elongated rod-like permanent magnet 66 of the external three-axis Faraday rotator assembly 48. The remaining element of the external Faraday rotator assembly 48 comprises an annular glass substrate 68 having a central aperture 70 for passage of the rod-shaped magnet. A reflective coating layer 72 is formed at the top of the substrate 68, rendering the combination of the substrate 68 and the reflective layer 72 a reverse mirror.

Figure 6:
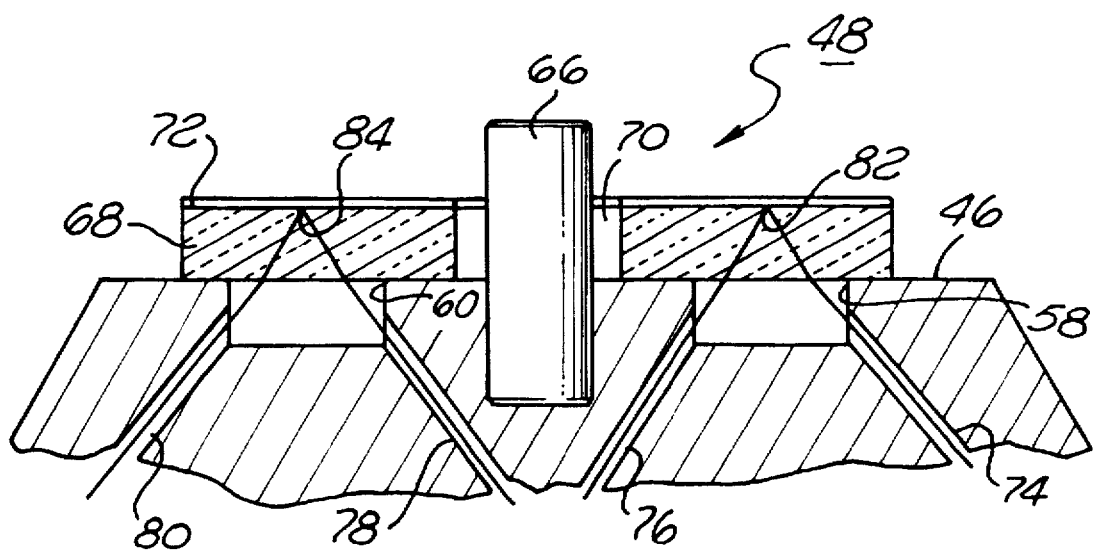
FIG. 6 is a cross-sectional view of the external Faraday rotator mounted to the regular octahedron-shaped frame taken at line 6—6 of FIG. 5.

FIG. 6 is a cross-sectional view taken generally at line 6—6 of FIG. 5 and showing the single external triaxial Faraday rotator assembly 48 fixed to the surface 46. Beams of light modes propagating through the converging pairs of cavity segments 74, 76 78, and 80 at the mirror wells 58 and 60 respectively, are refracted upon entering the glass substrate 68. As described with respect to the design of the external Faraday rotator assembly of the rhombic dodecahedron type, three factors, the thickness of the glass substrate, the index of refraction thereof and the degree to which the planar surface 46 is shaved or lowered from that of a frame employing intracavity Faraday assemblies are taken into consideration in designing the external assembly 48 so that the beams that enter the mirror wells converge upon common light contact points 82 and 84 at the surface of the reflective coating 72.

The principles of operation and advantages of the external Faraday rotator assembly of FIGS. 5 and 6 are the same as those of the external assembly of FIGS. 2 and 3. In both cases, the configurations offer, as advantages, not only the elimination of intracavity elements but also offer a greater degree of nonreciprocal splitting per unit of magnetic field (due to the double pass therethrough) while requiring only a single, as opposed to two, anti-reflective coating. The upper surface coating 72 is preferably semi-transmissive. This permits the mounting of output optics for all three axis upon the upper surface of the substrate 68.

II. Cavity Length Control Mirror

Figure 7:
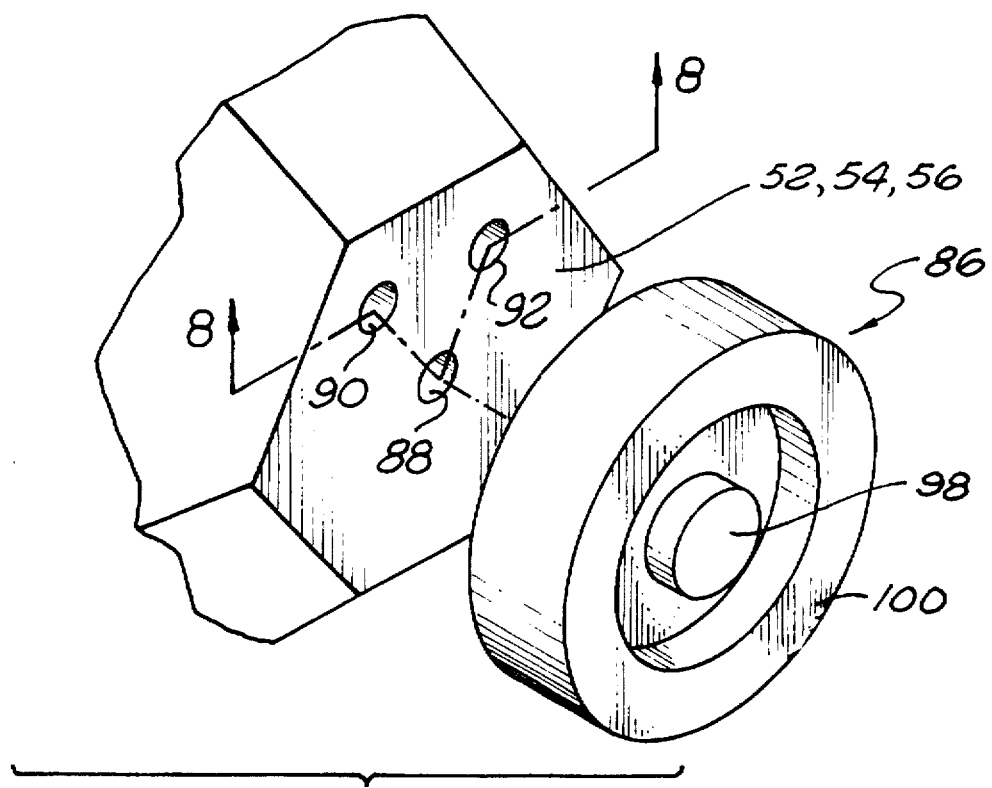
FIG. 7 is an exploded perspective view of a cavity length control mirror assembly for mounting to one of three faces of a multioscillator frame of the regular octahedron type.

FIG. 7 is an exploded perspective view of a cavity length control mirror 86 for mounting to one of the three "similar" surfaces 52, 54 and 56 of the multioscillator frame 44. (Similar refers to the shapes of the surfaces 52, 54 and 56 and, more importantly, to the relative positionings of mirror wells within those surfaces.) Each of the planar surfaces 52, 54 and 56 of the frame 44 is six-sided with a central mirror well 88 and a pair of de-centered mirror wells 90, 92, thus forming an equilateral triangle. At each of the three faces 52, 54 and 56 the central mirror well 88 is located at the convergence of pairs of segments of a different one of the three intersecting nonplanar cavities.

Figure 8:
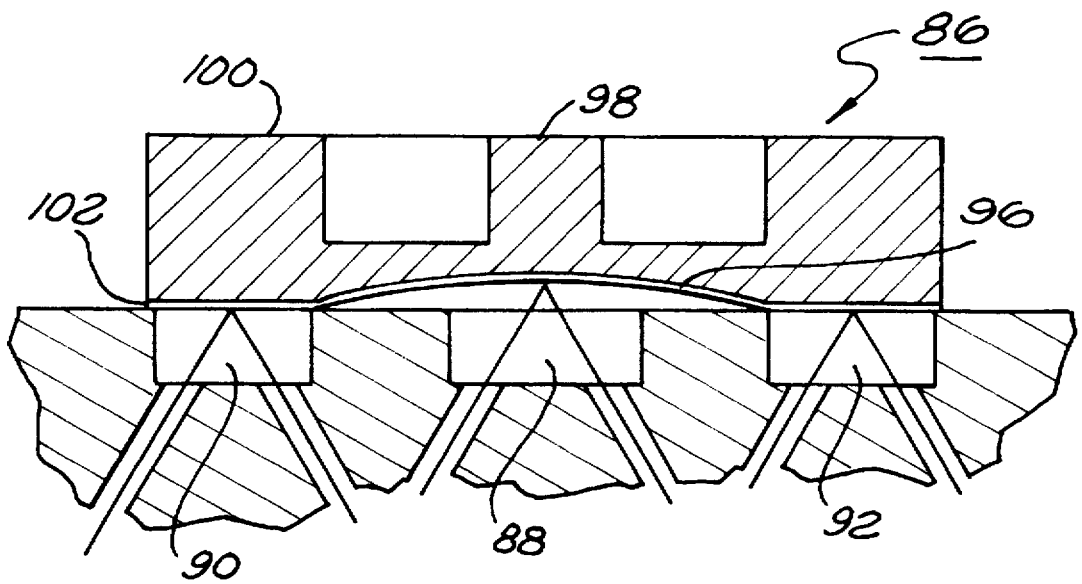
FIG. 8 is a cross-sectional view of a cavity length control mirror mounted to a face of the frame taken at line 8—8 of FIG. 7.

FIG. 8 is a cross-sectional view of the cavity length control mirror 86 mounted to one of the faces 52, 54 or 56 of the frame 44 taken at line 8—8 of FIG. 7. The mirror 86 comprises a machined structure of low thermal coefficient of expansion material such as ZERODUR. The lower surface 94 includes a central depression or dimple 96. Overlying the depression is a central post 98. The reduced thickness web formed by the central depression 96 connects the central post 98 to an encircling annular ridge 100. The bottom of the cavity length control mirror 86 comprises a reflective layer 102, preferably a quarter-wave stack of silica-titania. For a regular tetrahedron, the reflective surface 102 is tuned for total reflection at a 39.2315 degree angle of incidence.

The diameter of the cavity length control mirror 86 is about 0.9 inches. As such, in the case of a frame 46 suitable for a 10 cm path length gyro, when the mirrored central depression 96 is mounted to overlie the central mirror well 88 of one of the similar planar faces 52, 54 or 56, the encircling mirrored annular ridge 100 simultaneously overlies the de-centered mirror wells 90 and 92. Thus, the cavity length control mirror 86 provides two flat mirrors (at the wells 90 and 92) and a single curved mirror (at the well 88). Accordingly, it addresses the requirement that at least one curved mirror and a pzt-controlled mirror must be associated with each of the three nonplanar gyro cavities. By mirroring the entire bottom surface of the device to obtain a "three-in-one" mirror per each surface 52, 54 and 56, rather than employing distinct, tiny mirrors, one is able to mount a web flexure of maximum size to the small frame 44. This allows the cavity length control mirror 86 of the invention to overcome the problems associated with web stiffness that would otherwise occur in a system employing independent mirror mounts.

Thus, it is seen that the present invention provides teachings that enable one to realize the advantages of a multioscillator as taught by U.S. Pat. No. 4,795,258 in very small cavity length gyros. By employing the teachings of this invention, many highly desirable low accuracy applications may now be addressed by previously-unavailable configurations.

While this invention has been described with reference to its presently-preferred embodiment, it is not limited thereto. Rather, this invention is limited only insofar as it is described by the following set of patent claims and includes within its scope all equivalents thereof.

What is claimed is:

1. A ring laser gyroscope for measuring rotation about three orthogonal axes comprising, in combination:
   a) a three-dimensional frame;
   b) the exterior of said frame comprising a plurality of planar surfaces defining a rhombic dodecahedron;
   c) three intersecting closed non-planar cavities within said frame;
   d) each of said cavities comprising four straight segments of equal lengths that converge at planar surfaces of said frame;
   e) straight segments of at least two cavities converging at at least one planar surface of said frame;
   f) means for creating nonreciprocal splitting of modes in accordance with the Faraday effect being fixed to each of three planar surfaces of said frame; and
   g) each of said means includes (i) a disk-shaped mirror substrate, said substrate having opposed upper and lower surfaces, and being fixed to a planar surface of said frame, (ii) said upper surface of said substrate being substantially totally reflective and (iii) a pill-shaped permanent magnet being fixed to the upper surface of and coaxial with said substrate.

2. A ring laser gyroscope as defined in claim 1 wherein said substrate is quartz.

3. A ring laser gyroscope as defined in claim 1 wherein each of said three means for creating nonreciprocal splitting is fixed to a planar surface of said frame at which terminal ends of segments comprising a single nonplanar cavity converge.

4. A ring laser gyroscope for measuring rotation about three orthogonal axes comprising, in combination:
   a) a three-dimensional frame;
   b) the exterior of said frame comprising fourteen planar surfaces defining a truncated regular octahedron or tetrahedron;
   c) three intersecting closed non-planar cavities within said frame;
   d) each of said cavities comprising four straight segments of equal lengths, said segments of said cavities being arranged so that ends of adjacent segments of each of said cavities converge at a first, a second, a third and a fourth planar surface of said frame;

e) a pair of adjacent segments of one of each of said three cavities converging at the centers of said first, said second and said third planar surfaces;

f) adjacent segments of all of said cavities converging at said fourth planar surface in a pattern defining an equilateral triangle centered within said fourth planar surface;

g) means for creating nonreciprocal splitting of modes within all of said cavities in accordance with the Faraday effect being fixed to said fourth planar surface of said frame, said means comprising (i) a mirror substrate, (ii) the upper surface of said substrate being capable of reflecting at least a portion of incident light, and (iii) a magnet associated with said mirror substrate;

h) a cavity length control mirror fixed to each of said first, said second and said third planar surfaces of said frame; and i) each of said cavity length control mirrors comprising (i) a disk having opposed surfaces, (ii) one surface of said disk having a reflective coating throughout, (iii) said surface having a curved central indentation and a flat peripheral region, and (iv) said disk being fixed to said planar surface so that said central indentation overlies said convergence of segments of a nonplanar cavity at the center of said planar surface and said flat peripheral region overlies said convergence of segments of said other two nonplanar cavities.

5. A ring laser gyroscope for measuring rotation about three orthogonal axes comprising, in combination:

a) a three-dimensional frame;

b) the exterior of said frame comprising fourteen planar surfaces defining a truncated regular octahedron or tetrahedron;

c) three intersecting closed non-planar cavities within said frame;

d) each of said cavities comprising four straight segments of equal lengths, said segments of said cavities being arranged so that ends of adjacent segments of each of said cavities converge at a first, a second, a third and a fourth planar surface of said frame;

e) a pair of adjacent segments of one of each of said three cavities converging at the centers of said first, said second and said third planar surfaces;

f) adjacent segments of all of said cavities converging at said fourth planar surface in a pattern defining an equilateral triangle centered within said fourth planar surface;

g) means for creating nonreciprocal splitting of modes within all of said cavities in accordance with the Faraday effect being fixed to said fourth planar surface of said frame, said means comprising (i) a mirror substrate, (ii) the upper surface of said substrate including a partially-transmissive reflective coating, and (iii) a magnet associated with said mirror substrate;

h) said substrate being generally disk-shaped with a central aperture;

i) said magnet being rod-shaped;

j) said rod-shaped magnet being coaxial with and extending both above and beneath said substrate through said aperture; and k) a bore in said frame at the center of said fourth planar surface for receiving the lower portion of said rod-like magnet.

* * * * *